United States Patent Office

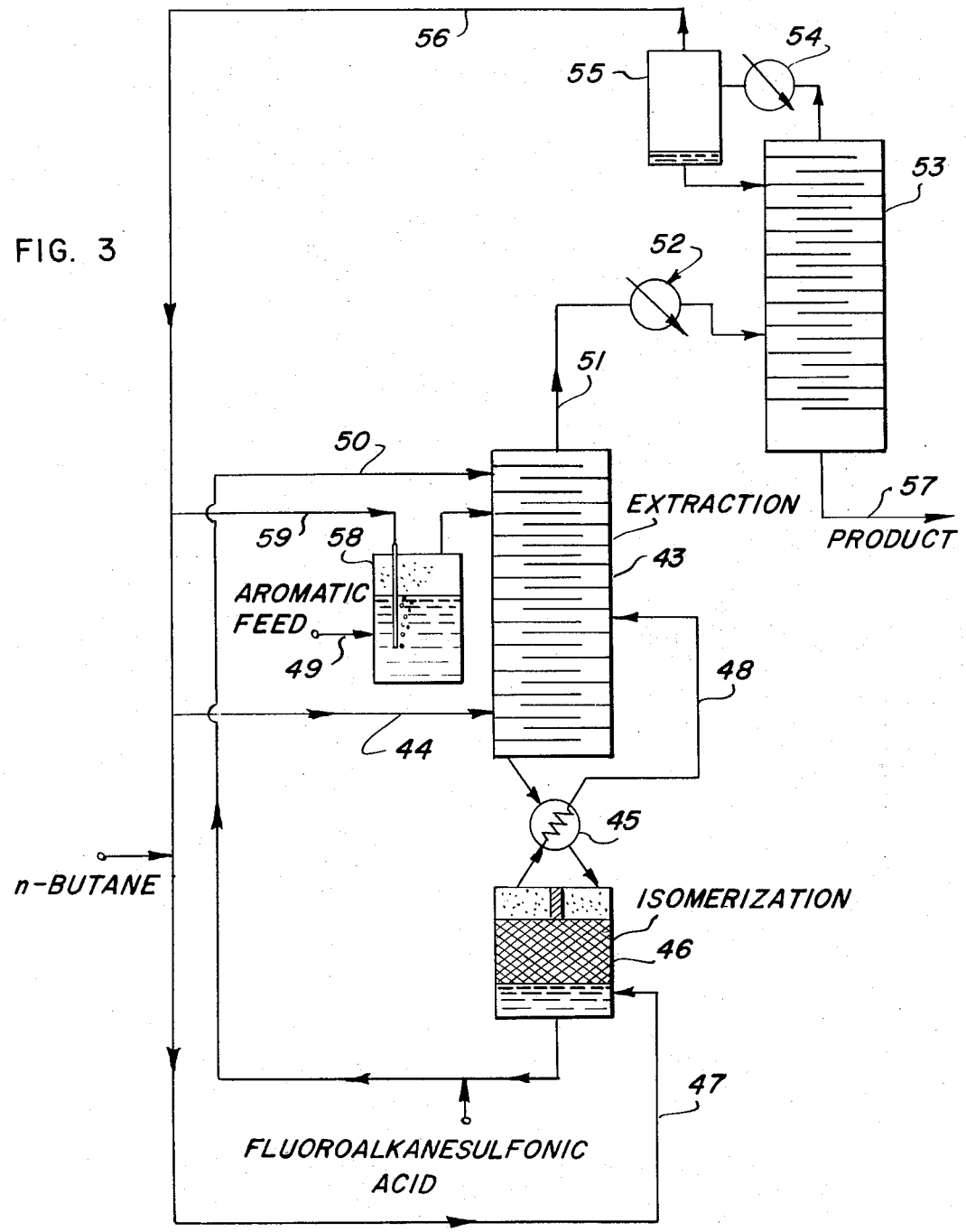

3,848,011
Patented Nov. 12, 1974

3,848,011
SEPARATION AND ISOMERIZATION OF ALKYL-SUBSTITUTED AROMATIC COMPOUNDS USING FLUOROALKANESULFONIC ACIDS
David A. McCaulay, Homewood, Ill., assignor to Standard Oil Company, Chicago, Ill.
Filed Dec. 29, 1972, Ser. No. 319,549
Int. Cl. C07c 5/24, 7/10
U.S. Cl. 260—668 A
10 Claims

ABSTRACT OF THE DISCLOSURE

Fluoroalkanesulfonic acids are shown to isomerize methyl-substituted aromatic compounds to mixtures of their isomers without appreciable disproportionation and, in addition, to preferentially extract the more basic isomers from mixtures containing methyl-substituted aromatic compound isomers. Processes for the use of such extraction and/or isomerization in continuous operations utilizing both liquid and gaseous carriers are disclosed herein.

SUMMARY OF THE INVENTION

This invention relates to the use of a fluoroalkanesulfonic acid to isomerize and/or extract alkyl-substituted aromatic compounds and, in particular, to continuous processes for isomerization and/or extraction of methyl-substituted aromatic compounds wherein a mixture of isomers having a given number of carbon atoms can be produced and/or the most basic isomer of said mixture can be selectively extracted at ambient temperature and above, said mixture in general being continuously produced from either a single isomer or a non-equilibrium mixture of isomers by using a fluoroalkanesulfonic acid as an isomerizing agent to produce a substantially equilibrium mixture.

In accordance with the instant invention an alkyl-substituted aromatic feed, for example, a xylene such as ortho-xylene, ethylbenzene or a mixture of $C_8$ aromatic isomers, preferably admixed with either a liquid or vapor carrier, is isomerized and/or extracted with, for example, trifluoromethanesulfonic acid to produce one or, optionally, two streams, one essentially meta-xylene and the second essentially ortho- and paraxylenes. Separation of the ortho-para mixture may then be accomplished by techniques well known in the art such as fractional crystallization.

BACKGROUND OF THE INVENTION

In the past materials such as hydrogen fluoride-boron trifluoride mixtures and fluorosulfonic acid-antimony pentafluoride mixtures have been used as isomerization catalysts and/or separation substances for aliphatic and aromatic hydrocarbons. These processes have been unsatisfactory to some degree as, for example, the hydrogen fluoride-boron trifluoride system is quite volatile and can only be used in a liquid-liquid extraction scheme. Now it has been found that isomerization and separation of methyl-substituted aromatic hydrocarbons may be accomplished using a fluoroalkanesulfonic acid without utilizing a metal-containing Lewis acid and, more importantly, such an acid may be used in processes wherein separation of catalyst and hydrocarbons is more economical as the hydrocarbons may be released without application of much heat. Thus, back isomerization is substantially reduced. Additionally, the entire operation operates at or near atmospheric pressure so that costly high pressure vessels and auxiliary equipment are not needed.

BRIEF DESCRIPTION OF THE DRAWINGS

FIG. 3 is the flow diagram for a system similar to that shown in FIG. 2 but wherein a gaseous carrier is employed.

STATEMENT OF THE INVENTION

Figure 1:
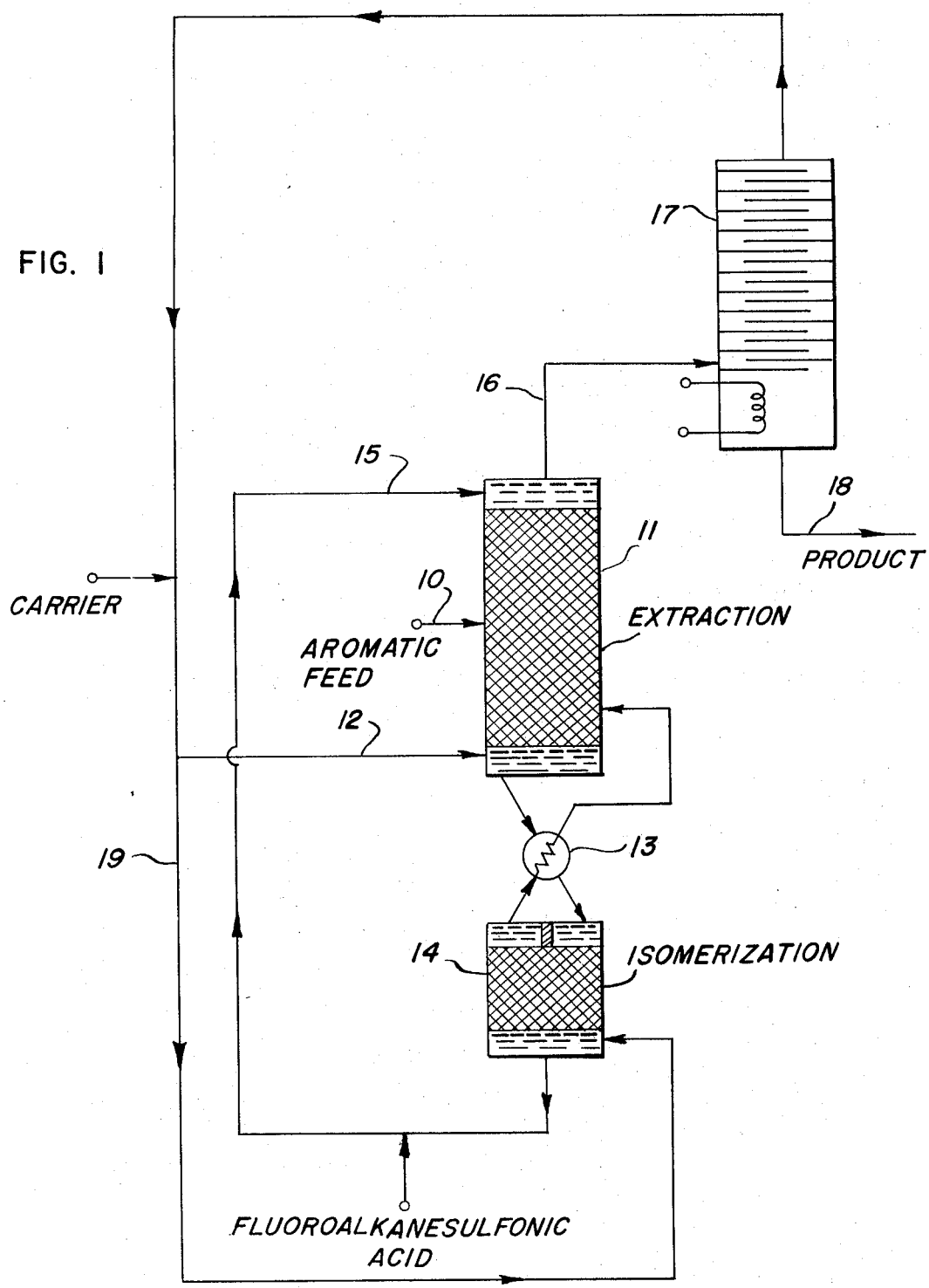
FIG. 1 shows the flow diagram of a technique using a liquid carrier for the continuous production of a mixture of substantially pure ortho- and para-xylene from a $C_8$ aromatic feed composed predominantly of xylenes.

FIG. 1 illustrates an embodiment of the instant invention wherein a liquid carrier is used. A $C_8$ stream containing substantially one or more xylenes (it may also include ethylbenzene and/or associated hydrocarbons) is passed through line 10 into packed extraction tower 11. A low boiling, inert carrier such as n-pentane is introduced into the bottom of packed tower 11 through line 12. A sufficient amount of n-pentane is added to remove a portion of the xylene from the acid phase. The remainder goes with the acid through heat exchanger 13 into isomerization zone 14. A fluoroalkanesulfonic acid, for example, trifluoromethanesulfonic acid, is brought into the upper part of extraction tower 11 through line 15. The operations in packed tower 11 are carried out at about ambient temperature in such a way as to effect the removal into the acid phase of substantially all of the meta-xylene from the charging stock and reflux. The hydrocarbon passes up through packed tower 11 against a counterflow of acid. The raffinate leaving the top of tower 11 through line 16 consists of the carrier, ortho-xylene and para-xylene plus any other components of the charge stock minus essentially all of the meta-xylene. The various fractions are separated in stripper 17. The bottoms product, consisting of $C_8$ aromatics is withdrawn through line 18. This product, because it is essentially free of meta-xylene, can be readily separated by a combination of crystallization and fractionation techniques into the individual pure ortho- and para-isomers.

Isomerization zone 14 is a small counter-current packed or staged extraction tower and is operated at temperatures between about 70° C. and about 125° C. using contact times that favor substantially complete isomerization to the equilibrium mixture of 20 weight percent ortho-, 20 weight percent para- and 60 weight percent meta-xylene. The acid phase is contacted with a rising stream of recycled carrier coming in via line 19 and essentially all of the hydrocarbon is removed and carried upward through heat exchanger 13 and line 20 into an appropriate section of packed tower 11.

In only a separation of meta- from the ortho-para- mixture is what is desired the scheme of FIG. 1 can be altered such that the isomerization reactor is removed and meta-xylene removed from the bottom of tower 11.

Figure 2:
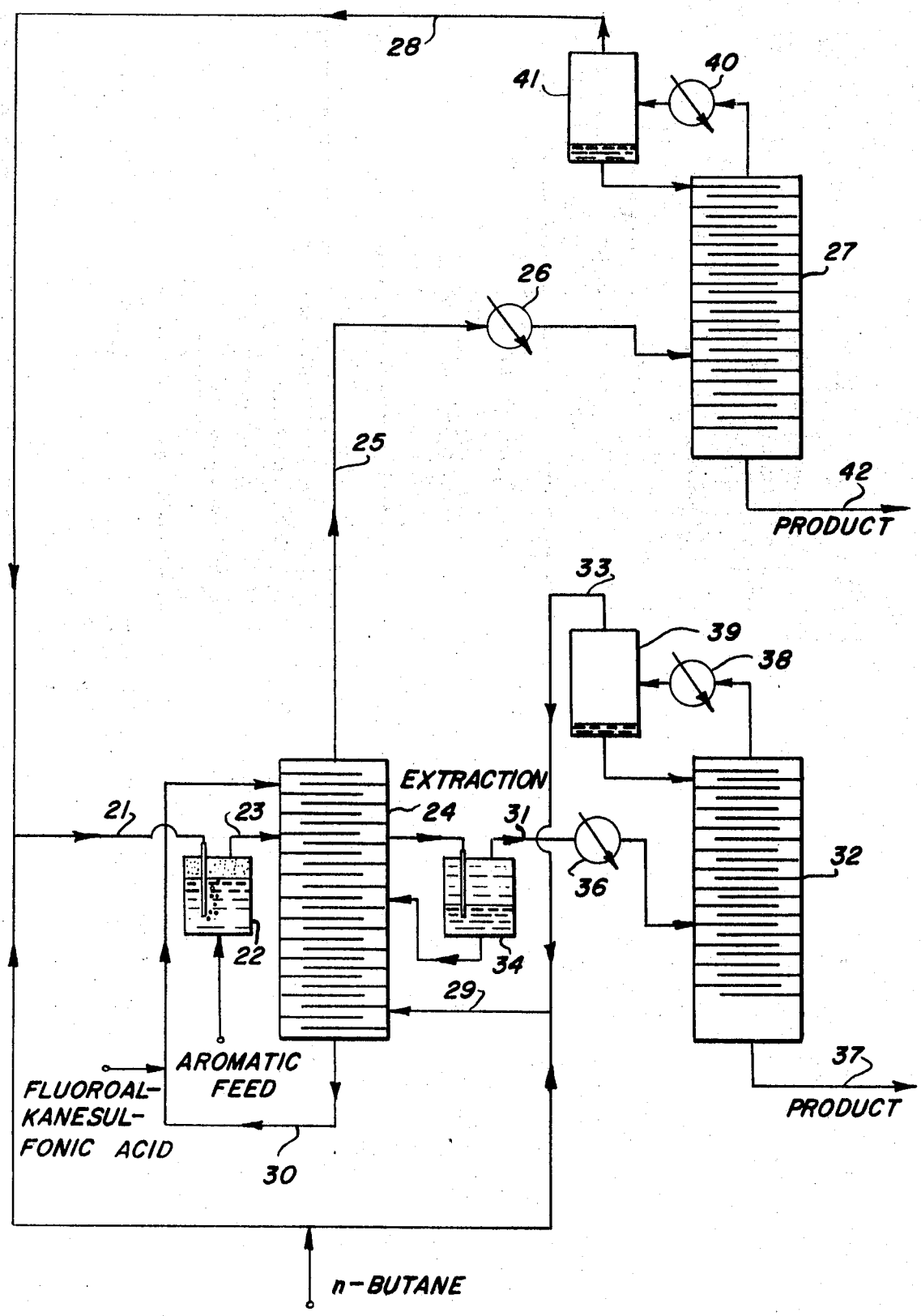
FIG. 2 shows the flow diagram of a technique employing a gaseous carrier for the continuous production from a $C_8$, predominantly-aromatic feed of a stream which is essentially an ortho- and para-xylene mixture and a stream which is essentially meta-xylene.

FIG. 2 illustrates an embodiment of the instant invention where a gaseous carrier is used. A light, inert, condensible gas such as n-butane is passed through line 21 into feed vaporizer 22 where it picks up vapors of the xylene feed kept at temperatures between about 20° C. and about 75° C. The gaseous mixture of n-butane and xylene then passes through line 23 into extraction column 24, which is operated at about the same temperature as vessel 22. The n-butane-xylene gas mixture then passes up the column counter-current to a descending liquid stream of acid, for example, trifluoromethanesulfonic acid. Isomer fractionation occurs as the gas proceeds up the column and the vapors leaving the top through line 25 are essentially free of meta-xylene. The overhead stream is liquefied by the refrigerant in condenser 26 and is passed into stripper 27. In stripper 27 the n-butane is separated from the ortho-para mixture and recycled via line 28 back to extraction column 13 via line 21 and column 24 via line 29. Product is removed through line 42.

Gaseous n-butane enters near the end of column 24 via line 29 and in the bottom portion of the column strips the xylene from the acid phase. The acid is then recycled via line 30 to the other end of the column. Gaseous product, rich in meta-xylene, is taken after acid removal in vessel 34, through line 31, condensed in condenser 36, and then passed into stripper 32. The n-butane is taken off overhead and recycled via line 33 to column 24. A stream of essentially meta-xylene is removed from the bottom of stripper 32 through line 37. Each stripping column is preferably equipped overhead to remove entrained product; components 38 and 39, and 40 and 41.

A combination extractive distillation-isomerization process using a gaseous carrier is shown in FIG. 3. Operation is similar to that previously described in FIG. 1 for the extraction of isomerization steps. Carrier is introduced into the bottom of extraction column 43 through line 44 in amounts sufficient to remove a portion of the meta-xylene in the descending acid phase. The remainder goes with the acid into heat exchanger 45 and into isomerization zone 46. This zone is a packed or staged column and is operated at temperatures between about 70° C. and about 125° C. using contact times that favor substantially complete isomerization to the equilibrium mixture of 20 weight percent ortho-, 20 weight percent para- and 60 weight percent meta-xylene. The acid phase is contacted with a rising stream of n-butane gas coming in via line 47 and essentially all of the hydrocarbon is removed and carried upward through heat exchanger 45 and line 48 into an appropriate section of tower 43. Acid is recycled to tower 43 through line 50 and carrier is recycled to vessel 58, tower 43 and isomerization zone 46 through lines 56 and 59, 56 and 44, and lines 56 and 47. The stripping column 53 is preferably equipped overhead with condenser and collector, 54 and 55, to remove entrained product.

Fluoroalkanesulfonic acids which may be used in the instant invention are (a) perfluoroalkanesulfonic acids containing one to about five carbon atoms, more preferably, one to about three carbon atoms and, most preferably, one to about two carbon atoms and (b) partially fluorinated alkanesulfonic acids containing a perfluoromethylene group alpha to the functional group and with the remaining carbon atoms substituted by a mixture of fluorine atoms and another highly electronegative substituting atom such as chlorine and, more preferably, $CF_2ClCF_2SO_3H$ or $CF_3CFClCF_2CO_3H$ and, most preferably, $CF_2ClCF_2SO_3H$.

Examples of alkyl-substituted aromatics also separable and/or isomerable by the processes of the instant invention are, trimethylbenzenes (hemimellitene, pseudocumene, mesitylene and mixtures thereof) and tetramethylbenzenes (durene, isodurene and prehnitene and mixtures thereof).

While the invention is described in connection with the specific examples below, it is to be understood that these are for illustrative purposes only. Many alternatives, modifications and variations will be apparent to those skilled in the art in the light of the below examples and such alternatives, modifications and variations will fall within the scope and spirit of the appended claims.

GENERAL EXPERIMENTAL PROCEDURE

The extraction experiments were carried out in a small glass "Reactivial." Hydrocarbon and acid were shaken for five minutes and allowed to settle for another five minutes. The two phases were separated by means of a hypodermic syringe. The raffinate was washed with water. The acid phase was poured over an equal weight of ice and the liberated hydrocarbon portion was collected.

The room temperature conversion runs were made in a 100 milliliter Teflon bottle stirred by a Teflon-encapsulated magnetic stirring bar. Samples were taken at intervals. The conversion run at 100° C. was carried out in a 300 milliliter Hastelloy C autoclave. Samples were withdrawn at intervals, cooled, phases separated, and washed with water.

All products were analyzed by gas chromatography using conventional techniques.

EXAMPLE I.—EXTRACTION OF $C_8$ AROMATICS WITH TRIFLUOROMETHANESULFONIC ACID

[2 volumes of hydrocarbon per volume of trifluoromethanesulfonic acid]

| | Run No. 1 | | | Run No. 2 | | | Run No. 3 | | | Run No. 4 | | | Run No. 5 | | |
|---|---|---|---|---|---|---|---|---|---|---|---|---|---|---|---|
| | Temp., 25° C. | | | Temp., 25° C. | | | Temp., 25° C. | | | Temp., 0° C. | | | Temp., 25° C. | | |
| | Feed | Raff | Ext | Feed | Raff | Ext | Feed | Raff | Ext | Feed | Raff | Ext | Feed | Raff | Ext |
| Composition (weight percent): | | | | | | | | | | | | | | | | |
| n-Hexane | 65.5 | 66.5 | 30.0 | 66.1 | 68.5 | 30.4 | 0.0 | 0.0 | 0.0 | 0.0 | 0.0 | 0.0 | 63.4 | 63.9 | 49.1 |
| Benzene | 0.0 | 0.0 | 0.0 | 0.0 | 0.0 | 0.0 | 0.0 | 0.0 | 0.0 | 0.0 | 0.0 | 0.0 | 0.0 | 0.1 | 1.0 |
| Ethylbenzene | 0.0 | 0.0 | 0.0 | 0.0 | 0.0 | 0.0 | 0.0 | 0.0 | 0.0 | 0.0 | 0.0 | 0.0 | 18.3 | 18.0 | 20.3 |
| para-Xylene | 0.0 | 0.0 | 0.0 | 16.4 | 16.6 | 24.0 | 48.5 | 51.1 | 42.7 | 48.5 | 51.4 | 39.7 | 18.3 | 17.8 | 27.6 |
| meta-Xylene | 17.3 | 16.4 | 44.3 | 17.4 | 14.8 | 45.6 | 51.4 | 48.6 | 57.0 | 51.4 | 48.6 | 60.3 | 0.0 | 0.0 | 0.0 |
| ortho-Xylene | 17.2 | 17.1 | 25.7 | 0.1 | 0.1 | 0.0 | 0.0 | 0.0 | 0.0 | 0.1 | 0.1 | 0.0 | 0.0 | 0.0 | 0.0 |
| Diethylbenzene | 0.0 | 0.0 | 0.0 | 0.0 | 0.0 | 0.0 | 0.0 | 0.0 | 0.0 | 0.0 | 0.0 | 0.0 | 0.0 | 0.2 | 2.0 |
| Isomer ratios: | | | | | | | | | | | | | | | | |
| meta-to-ortho | 1.006 | 0.958 | 1.726 | | | | | | | | | | | | |
| meta-to-para | | | | 1.06 | 0.892 | 1.901 | 1.06 | 0.952 | 1.336 | 1.06 | 0.947 | 1.516 | | | |
| para-to-Ethylbenzene | | | | | | | | | | | | | 0.996 | 0.991 | 1.358 |
| Beta (single-stage separation factor)* | 1.80 | | | 2.13 | | | 1.40 | | | 1.60 | | | 1.37 | | |
| Volume of aromatic extracted per 100 volumes of trifluoromethanesulfonic acid | 8 | | | 8 | | | 35 | | | 24 | | | 4 | | |

*Beta = $\frac{\text{META ext/PARA ext}}{\text{META raff/PARA raff}}$

EXAMPLE II.—EXTRACTION OF XYLENES WITH PERFLUOROBUTANESULFONIC ACID

[2 volumes of hydrocarbon per volume of perfluorobutanesulfonic acid]

| | Run No. 1 | | | Run No. 2 | | |
|---|---|---|---|---|---|---|
| | Temp., 25° C. | | | Temp., 25° C. | | |
| | Feed | Raff | Ext | Feed | Raff | Ext |
| Composition (weight percent): | | | | | | |
| n-Hexane | 66.3 | 64.80 | 45.33 | | | |
| Ethylbenzene | | 0.11 | | | | |
| para-Xylene | 16.9 | 17.95 | 22.90 | 50.1 | 50.9 | 44.9 |
| meta-Xylene | 16.7 | 17.14 | 31.77 | 49.9 | 49.1 | 55.1 |
| Isomer ratios: meta-to-para | 0.882 | 1.39 | | 0.963 | 1.228 | |
| Beta (single-stage separation factor) | 1.58 | | | 1.27 | | |

EXAMPLE III.—CONVERSION OF ETHYLBENZENE

[8.75 volumes of ethylbenzene per volume of trifluoromethanesulfonic acid]

| Sample number | 1 | 2 | 3 | 4 | 5 |
|---|---|---|---|---|---|
| Reaction time (hours) | 1.0 | 17.5 | 25.8 | 90.0 | 118.5 |
| Composition (weight percent): | | | | | |
| Benzene | 0.8 | 6.7 | 10.4 | 17.2 | 18.4 |
| Ethylbenzene | 98.0 | 79.0 | 72.7 | 54.4 | 51.8 |
| 1,3-diethylbenzene | 0.5 | 8.2 | 10.2 | 17.7 | 19.0 |
| 1,4-diethylbenzene | 0.7 | 5.7 | 6.2 | 8.0 | 7.9 |
| 1,2-diethylbenzene | | | | 0.1 | 0.1 |
| 1,3,5-triethylbenzene | | 0.3 | 0.4 | 1.8 | 2.1 |
| 1,2,4-triethylbenzene | | 0.1 | 0.1 | 0.4 | 0.5 |
| Higher | | | | 0.4 | 0.3 |

EXAMPLE IV.—CONVERSION OF XYLENES

| Run number | 1 | 2 | | | |
|---|---|---|---|---|---|
| Feed, milliliters: | | | | | |
| para-Xylene | 35 | | | | |
| meta-Xylene | | 150 | | | |
| Trifluoromethanesulfonic acid | 4 | 48 | | | |
| Temperature, °C | 25 | 100 | | | |
| Reaction time, hours | 160 | 0.33 | 1.08 | 2.67 | 18.8 |
| Composition (weight percent): | | | | | |
| Benzene | 0.0 | 0.0 | 0.0 | 0.0 | 0.1 |
| Toluene | 0.2 | 0.2 | 0.3 | 1.4 | 12.2 |
| para-Xylene | 98.2 | 4.5 | 8.8 | 15.1 | 15.6 |
| meta-Xylene | 1.3 | 92.4 | 85.3 | 72.2 | 45.3 |
| ortho-Xylene | 0.1 | 2.7 | 5.4 | 10.1 | 14.2 |
| 1,3,5-trimethylbenzene | 0.0 | 0.1 | 0.1 | 0.6 | 3.9 |
| 1,2,4-trimethylbenzene | 0.2 | 0.1 | 0.1 | 0.6 | 8.4 |
| 1,2,3-trimethylbenzene | | | | | 0.3 |
| Xylene distribution: | | | | | |
| para-Xylene | 98.6 | 4.5 | 8.9 | 15.5 | 20.8 |
| meta-Xylene | 1.3 | 92.8 | 85.7 | 74.1 | 60.3 |
| ortho-Xylene | 0.1 | 2.7 | 5.4 | 10.4 | 18.9 |

What is claimed is:

1. A process to extract the most basic methyl-substituted aromatic compound from a mixture comprising methyl-substituted aromatic compound isomers which comprises intimately contacting said mixture at about ambient temperature with at least one fluoroalkanesulfonic acid of formula $RCF_2SO_3H$ wherein $R=Cl$, F, $CF_3$, $CF_2Cl$, $C_2F_5$, $CF_3CFCl$, $C_3F_7$, or $C_4F_9$ and subsequently separating said acid from said mixture, said mixture after said contacting containing proportionately less of said most basic compound than said mixture prior to said contacting.

2. The process of Claim 1 wherein said fluoroalkanesulfonic acid is trifluoromethanesulfonic acid or perfluoroethanesulfonic acid.

3. The process of Claim 2 wherein said methyl-substituted aromatic compound isomers are xylenes.

4. A process to isomerize a material comprising a methyl-substituted aromatic compound or a non-equilibrium isomeric mixture thereof which comprises:
    (a) intimately contacting said material comprising a methyl-substituted aromatic compound or a non-equilibrium isomeric mixture thereof at a temperature between about 70° C. and about 125° C. with a catalyst consisting essentially of at least one fluoroalkanesulfonic acid of formula $RCF_2SO_3H$ wherein $R=Cl$, F, $CF_3$, $CF_2Cl$, $C_2F_5$, $CF_3CFCl$, $C_3F_7$, or $C_4F_9$, and
    (b) subsequently separating said acid from the product of step (a).

5. The process of Claim 4 wherein said fluoroalkanesulfonic acid is trifluoromethanesulfonic acid or perfluoroethanesulfonic acid.

6. The process of Claim 5 wherein said methyl-substituted aromatic compound or a non-equilibrium isomeric mixture thereof is a xylene or a mixture of xylenes.

7. A process to isomerize a material comprising a methyl-substituted aromatic compound or an isomeric mixture thereof and to extract from the isomerized product the most basic isomer in said isomerized product which comprises:
    (a) intimately contacting said material comprising said methyl-substituted aromatic compound or an isomeric mixture thereof between about 70° C. and about 125° C. with at least one fluoroalkanesulfonic acid of formula $RCF_2SO_3H$ wherein $R=Cl$, F, $CF_3$, $CF_2Cl$, $C_2F_5$, $CF_3CFCl$, $C_3F_7$, or $C_4F_9$, and
    (b) subsequently separating said acid from the product of step (a) to form a product substantially acid-free, and
    (c) intimately contacting said product substantially acid-free at about ambient temperature with at least one fluoroalkanesulfonic acid of formula $RCF_2SO_3H$ wherein $R=Cl$, F, $CF_3$, $CF_2Cl$, $C_2F_5$, $CF_3CFCl$, $C_3F_7$ or $C_4F_9$, and
    (d) substantially removing the acid from the product of step (c).

8. The process of Claim 7 wherein said fluoroalkanesulfonic acid is trifluoromethanesulfonic acid or perfluoroethanesulfonic acid.

9. The process of Claim 8 wherein said methyl-substituted aromatic compound or an isomeric mixture thereof is a xylene or a mixture of xylenes.

10. A continuous process to isomerize a material comprising a methyl-substituted aromatic compound or an isomeric mixture thereof and to extract from the isomerized product the most basic isomer in said isomerized product which comprises:
    (a) intimately contacting said material at a temperature between about 70° C. and about 125° C., at least partially solubilized in an inert carrier, in an isomerization zone with at least one fluoroalkanesulfonic acid of formula $RCF_2SO_3H$ wherein $R=Cl$, F, $CF_3$, $CF_2Cl$, $C_2F_5$, $CF_3CFCl$, $C_3F_7$, or $C_4F_9$ until an essentially equilibrium isomeric mixture is obtained, and
    (b) cooling the product of step (a) to about ambient temperature, and
    (c) intimately contacting in a counter-current extraction zone the product of step (b) with additional said acid to form two streams, a first stream comprising essentially all of the least basic isomers of said essentially equilibrium isomeric mixture and a second stream comprising essentially all of the most basic of said equilibrium isomeric mixture, and
    (d) introducing said first stream containing essentially all the less basic isomers into a separation zone wherein the carrier contained in said first stream is separated from said less basic isomers, and
    (e) recycling the carrier contained in said first stream, and
    (f) separating the acid from said second stream to give a third stream and an acid stream, and
    (g) recycling said acid stream to said counter-current extraction zone, and
    (h) introducing said third stream into a separation zone wherein the carrier contained in said third stream is separated from said most basic isomer, and
    (i) recycling the carrier contained in said third stream.

References Cited
UNITED STATES PATENTS
3,766,286    10/1973    Olah _____ 260—668 A CURTIS R. DAVIS, Primary Examiner U.S. Cl. X.R.
260—674 A, 674 SE

PO-1050
(5/69)

UNITED STATES PATENT OFFICE
CERTIFICATE OF CORRECTION

Patent No. 3,848,011               Dated  November 12, 1974

Inventor(s)  David A. McCaulay

It is certified that error appears in the above-identified patent and that said Letters Patent are hereby corrected as shown below:

Column 2 - line 53 - the word reads "In" - should read - "If"

Column 3 - line 71 - $CF_3CFClCF_2CO_3H$ - should read: $CF_3CFClCF_2SO_3H$

Signed and sealed this 8th day of April 1975.

(SEAL)
Attest:

RUTH C. MASON
Attesting Officer

C. MARSHALL DANN
Commissioner of Patents
and Trademarks